Patented Feb. 6, 1934

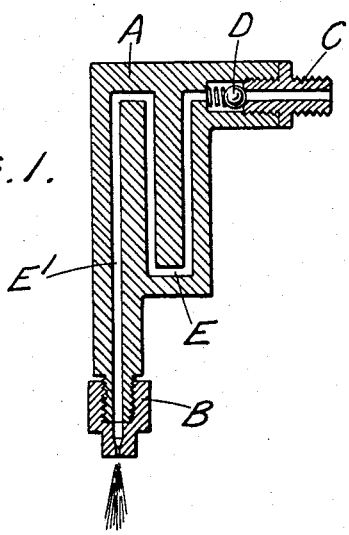
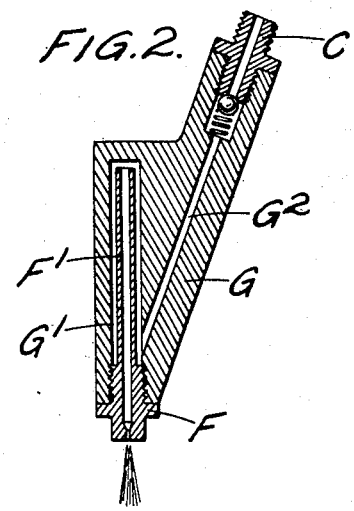
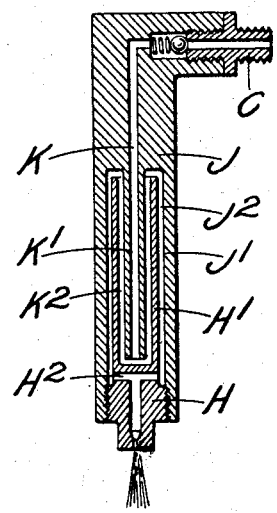

1,946,339

UNITED STATES PATENT OFFICE 1,946,339

FUEL INJECTION DEVICE FOR INTERNAL COMBUSTION ENGINES

Ronald Whitehair Vigers and Ernest Edward Chatterton, London, England, assignors to D. Napier & Son Limited, London, England, a company of Great Britain Application February 26, 1932, Serial No. 595,407, and in Great Britain June 25, 1931

5 Claims. (Cl. 299—107.1)

This invention relates to fuel injection devices for internal combustion engines and has particular reference to liquid fuel injection devices of the airless open nozzle type, that is to say injection devices in which the pressure of the fuel itself causes injection and no air is injected with the fuel and the nozzle is not provided with a controlling valve.

With injection devices of this type it has been found that if the fuel supply is temporarily cut off as, for example, when a road vehicle or aeroplane is coasting and driving its engine, the fuel left in the injection device tends to pass as by draining through the nozzle, so as to allow the engine to force air through the injection nozzle into the fuel line. When therefore the pump is again brought into operation the engine is sluggish in picking up or in some cases entirely fails to do so on account of air being trapped in the pipe line, and the present invention has for its object to overcome this difficulty.

To this end according to the invention the injection device is so formed that when this device is disposed so as to inject fuel downwardly the fuel is delivered upwardly through a delivery passage in the injection device before it passes downwardly to the nozzle. Fuel thus tends to be retained in the upwardly directed passage so as to form a seal to prevent air entering the fuel line leading to the injection device.

Preferably the fuel passage in the injection device through which fuel is delivered to the fuel delivery passage or injection conduit connected at its lower end to the injection nozzle passes first downwardly and then upwardly to the upper end of the injection pipe so as to form a trap for the liquid fuel. The fuel passage in the injection device may be formed with one or more substantially U-shaped bends wherein a quantity of fuel is maintained by gravity or the injection device may comprise a downwardly directed injection chamber or passage which communicates at its lower or outer end with an injection nozzle and at its upper or inner end with an intermediate conduit or chamber, a feed passage or tube communicating with the intermediate chamber at a level below the upper end of the injection passage.

While the injection chamber or passage is above described as being downwardly directed a fuel injection device according to the invention may also be employed with the injection passage and nozzle directed upwardly, the formation of the fuel passage ensuring that when fuel injection is not taking place a quantity of fuel is trapped in the injection device.

The invention may be carried into practice in various ways but three constructions according thereto are illustrated somewhat diagrammatically in section and by way of example in the accompanying drawing, in which:—

Figure 1 is a diagrammatic section through a fuel injection device for use with an internal combustion engine of the liquid fuel injection compression ignition type.

Figure 2 is a view similar to Figure 1 illustrating a modified form of the device, and Figure 3 is a figure similar to Figures 1 and 2 illustrating a further modified form of device.

In the construction illustrated in Figure 1, injection device A is furnished with an injection nozzle B and an inlet nipple C normally closed by a spring-controlled non-return valve D. The passage connecting the inlet C to the injection nozzle B is, in accordance with the present invention, formed with a bend E as shown so that when the fuel supply to the injection device is cut off, though fuel in the final delivery conduit or injection passage $E^1$ may all drain or be withdrawn through the injection nozzle B a quantity of liquid fuel will be trapped in the bend E and will thus prevent the passage of air from the engine to the pipe line. Further, when the injection nozzle B is upwardly directed, the bend formed in the fuel passage between the injection pipe $E^1$ and the adjacent parallel portion of the bend E will serve as a trap acting in a similar manner when the fuel supply is cut off.

Figure 2 illustrates another construction in which the injection nozzle F has an integral injection tube $F^1$ which projects into a chamber $G^1$ formed within the body G of the injection device so that the upper end of the injection tube $F^1$ communicates with the upper end of the chamber $G^1$. A feed passage $G^2$ connects the inlet C to the lower end of the intermediate chamber $G^1$ so that when the fuel supply to the injection device is cut off a quantity of fuel will be trapped in the intermediate chamber $G^1$. Further as in the construction shown in Figure 1 when the device is used with the injection nozzle upwardly directed that end of the intermediate chamber $G^1$ adjacent to the inner end of the injection tube $F^1$ will serve as a liquid trap.

In yet another construction which is illustrated in Figure 3, the injection nozzle H has an integral cylindrical tube $H^1$ which projects into a recess or chamber $J^1$ formed in the body J of the injection device, an annular clearance space or injection chamber $J^2$ being thus formed between the tube $H^1$ and the inner wall of the chamber $J^1$. Radial passages $H^2$ connect the injection chamber $J^2$ to the injection nozzle H. A feed conduit K communicating at one end with the inlet C passes through a central wall $K^1$ formed integral with the body of the injection device and of such dimensions that an annular clearance space or intermediate chamber $K^2$ is formed between the wall $K^1$ and the inner wall of the tube $H^1$. Thus normally the fuel flows from the inlet C through the conduit K to the bottom of the intermediate chamber $K^2$ from the top of which the fuel passes to the top of the annular injection chamber $J^2$ and thence through the passages $H^2$ to the injection nozzle H. When the supply of fuel to the device is cut off a quantity of fuel will be retained in the intermediate chamber $K^2$ thereby preventing the pipe line from being filled with air.

As in the construction illustrated in Figures 1 and 2, the construction shown in Figure 3 may be employed with the injection nozzle H directed upwardly, and the ends of the chambers $J^2$, $K^2$ adjacent to the inner end of the tube $H^1$ will then serve as a liquid trap when the supply of fuel to the injection device is cut off.

As will be readily seen in an injection device embodying the present invention all the fuel in the device will not be withdrawn when the fuel supply is cut off so that the possibility of the pipe line becoming filled with air during idle periods and effective injection thus impaired when injection recommences, is reduced to a minimum.

It will be understood that the constructions above described are given by way of example only and that these may be modified within wide limits without departing from the spirit of the invention.

What we claim as our invention and desire to secure by Letters Patent is:—

1. A fuel injection device of the airless open nozzle type for association with an internal combustion engine of the liquid fuel injection compression ignition type comprising an open nozzle, and a part formed with an unobstructed supply passage to said nozzle, said passage comprising a straight delivery passage communicating at its lower end with the nozzle, a straight intermediate passage communicating at its upper end with the upper end of the delivery passage, and a straight feed passage communicating at its lower end with the lower end of the intermediate passage.

2. A fuel injection device of the airless open nozzle type for association with an internal combustion engine of the liquid fuel injection compression ignition type comprising an open nozzle and a part formed with an unobstructed fuel supply passage to said nozzle, said passage comprising a delivery passage communicating at its lower end with the nozzle, an intermediate passage communicating at its upper end with the upper end of the delivery passage, and a feed passage communicating at its lower end with the lower end of the intermediate passage.

3. For association with an internal combustion engine of the liquid fuel injection compression ignition type, a fuel injection device of the airless open nozzle type, comprising a nozzle adapted to deliver fuel into the cylinder of the engine and a body part having outer, inner and intermediate concentric passages, the outer passage communicating at its lower end with the nozzle and at its upper end with the upper end of the intermediate passage, while the inner passage constitutes the passage through which fuel is delivered to the device and opens at its lower end into the lower end of the intermediate passage.

4. For association with an internal combustion engine of the liquid fuel injection compression ignition type, a fuel injection device of the airless opening nozzle type, comprising a body part having formed therein a tubular recess and a fuel delivery passage communicating with such recess adjacent to the lower end of the recess, and a nozzle member adapted to deliver fuel into the cylinder of the engine and closing the lower end of the recess and having a tubular extension which projects within the recess to a point above the end of the passage through which fuel is delivered to the recess as set forth.

5. For association with an internal combustion engine of the liquid fuel injection compression ignition type, a fuel injection device of the airless open nozzle type, comprising a body part containing a tubular recess from the upper end, and towards the lower end of which extends a tubular conduit through which fuel is delivered to the recess, and a nozzle member adapted to deliver fuel into the cylinder of the engine and closing the lower end of the recess and provided with a tubular projection closed at its lower end and open at its upper end, this projection being spaced from and lying between the wall of the recess and the tubular conduit, one or more passages forming a communication between the nozzle and the space between the tubular projection on the nozzle and the wall of the recess so that fuel delivered through the tubular conduit can pass upwards between the wall of this conduit and the projection on the nozzle and then downwards between the wall of the recess and the projection on the nozzle and thence through the communicating passage or passages to the nozzle.

RONALD WHITEHAIR VIGERS.
ERNEST EDWARD CHATTERTON.